Feb. 20, 1962   J. L. BORDEN   3,022,124
BEARING
Filed Dec. 18, 1959
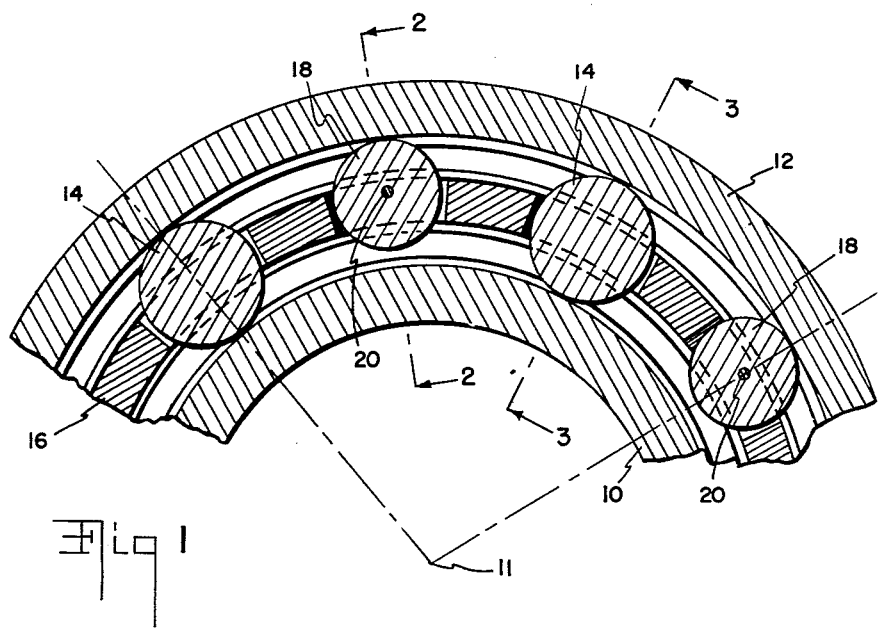
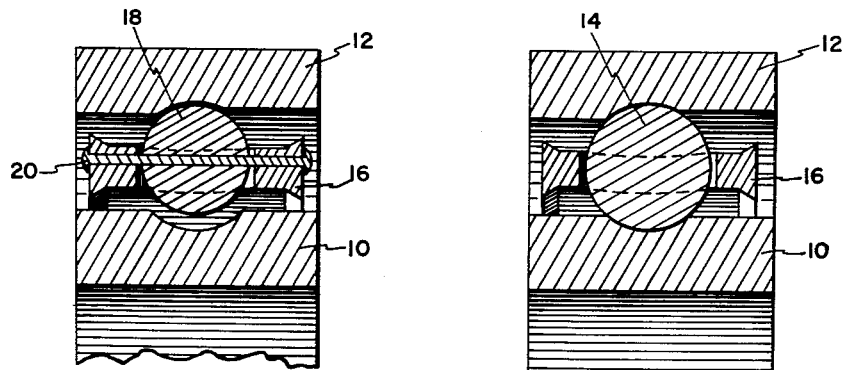
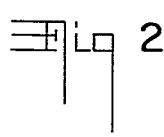
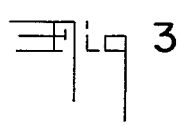
INVENTOR.
JOSEPH L. BORDEN
BY
ATTORNEY United States Patent Office 3,022,124
Patented Feb. 20, 1962

3,022,124
BEARING
Joseph L. Borden, Westport, Conn., assignor to The Perkin-Elmer Corporation, Norwalk, Conn., a corporation of New York
Filed Dec. 18, 1959, Ser. No. 860,507
8 Claims. (Cl. 308—193)

This invention relates to an improved bearing and, more particularly, to a ball bearing designed to withstand high centrifugal forces.

It is occasionally desirable to provide rotating apparatus wherein members that are moving with respect to one another are also rotating with respect to an external point. An example of this situation may be visualized by imagining a cylindrical drum rotating about its own longitudinal axis and a second drum surrounding the first but rotating at a slightly slower speed. A particular use for this type of apparatus is disclosed in my copending application Serial No. 862,438, filed December 21, 1959. If a ball bearing is located between the drums, the relatively slow movement between the surfaces will create no particular bearing problems. However, as the absolute rotational velocities increase, it will be found that the balls tend to collect on one side, probably due to the increasing centrifugal forces acting upon them. This, in turn, causes the bearing to become unbalanced and tend to lock.

It is, therefore, the primary object of the present invention to provide an improved bearing. Other objects are to provide such a bearing including rolling means; to provide a bearing operable at high centrifugal forces; to provide a bearing particularly well suited to low torque applications; and to provide a bearing adapted to maintain the rolling means in spaced circumferential relationship.

The manner in which the above objectives are achieved will be more apparent from the following description, appended claims, and three figures of the attached drawing wherein:

FIG. 1 is a cross-sectional elevation of a portion of a bearing constructed in accordance with the present invention;

FIG. 2 is a section taken along the line 2—2 of FIG. 1; and

FIG. 3 is a section taken along the line 3—3 of FIG. 1.

The present invention comprises bearing apparatus including first and second coaxial circular bearing races. A plurality of rolling members are provided in separating rolling relationship between the races. Spacing means are located between the races and maintain the rolling members in spaced relationship. Retaining means are then provided to keep the spacing means in a relatively fixed position between the races.

The above features will be more apparent by reference to the drawing wherein an inner bearing race 10 and an outer bearing race 12 are rotatable about an external axis passing through point 11. Inner bearing race 10 and outer bearing race 12 are separated by ball bearings 14. A circular spacing member 16 is spaced intermediate the inner and outer races and contains openings of sufficient size to contain balls 14 and allow free rotation of the balls therein.

In alternating relationship with balls 14, spacing balls 18 of slightly smaller diameter than balls 14 are retained on axle pins 20 contained in spacing member 16. Balls 18 are retained within holes larger than the balls and pins 20 are displaced from the center line of spacing member 16 by an amount equal to approximately one half the difference between the diameters of balls 14 and balls 18.

It will now be seen that as the bearing structure rotates about point 11, spacing member 16 will be acted upon by high centrifugal forces. Apparently due to slight differences in mass in various portions of member 16, there is a tendency for it to become unbalanced and move away from its position intermediate the races. Due to the presence of spacing balls 18, however, the member 16 is caused to remain in a fixed location between races 10 and 12. By thus maintaining the member 16 at the midpoint of balls 14, there will be no tendency for balls 14 to "climb" out of their retaining openings and thus bind between member 16 and either race 10 or 12.

As a specific example of the present invention, a bearing was designed for use between an inner cylinder having a 6.5 inch external diameter and rotating at 6000 r.p.m. and an outer cylinder rotating in the same direction at 5970 r.p.m. The steel spherical bearings 14 were .3437" in diameter and the steel spacing bearings 18 were spheres .3337" in diameter. Six of each were alternately positioned around the periphery. The circular spacer was of an aluminum alloy and had an I beam cross section .040" thick through the web and .445" wide. The pins supporting the spacing spheres were approximately .030" in diameter and were bent over at each side of the spacer.

It is to be understood that the foregoing description is not to be construed as limiting the scope of the invention. Many other variations are also possible. For example, roller elements may be approximately cylindrical rather than spherical. The scope of this invention is limited only by the scope of the following claims.

I claim:
1. Bearing apparatus which comprises inner and outer coaxial circular bearing race means; a plurality of first rolling member means in separating relationship between said inner and outer race means and adapted to roll therebetween; spacing means comprising a hollow cylinder interjacent the inner and outer races, said cylinder being coaxial with said races, the surface of said cylinder defining a plurality of first openings, each of said first openings containing one of said first rolling member means; second rolling member means affixed to said spacing means and rolling against said outer race to maintain said spacing means in fixed, separated relationship with said outer race.

2. The apparatus of claim 1 wherein said second rolling member means are mounted to rotate on axle means supported by said spacing means.

3. The apparatus of claim 2 wherein said spacing means defines a plurality of second openings, each of said second openings receiving at least a portion of each of said second rolling member means.

4. The apparatus of claim 3 wherein each of said axle means is mounted within a second opening.

5. The apparatus of claim 4 wherein each of said second rolling member means is of smaller diameter than said first rolling member means.

6. The apparatus of claim 5 wherein the axle of each of said second rolling member means is retained radially outward of the circumferential center line of said spacing means by an amount equal to one half the difference in diameter between said second rolling member means and said first rolling member means.

7. The apparatus of claim 6 wherein each of said first rolling member means is a sphere.

8. The apparatus of claim 6 wherein all of said first and second rolling member means are spheres.

References Cited in the file of this patent
UNITED STATES PATENTS
1,204,938   Chapman _____ Nov. 14, 1916
FOREIGN PATENTS
14,087   Great Britain _____ June 9, 1897
of 1897